March 28, 1967   W. FRIEDL   3,311,843
VISIBLE He-Ne LASER HAVING A PRESSURE BELOW 0.8 TORR
Filed March 18, 1963   4 Sheets-Sheet 2

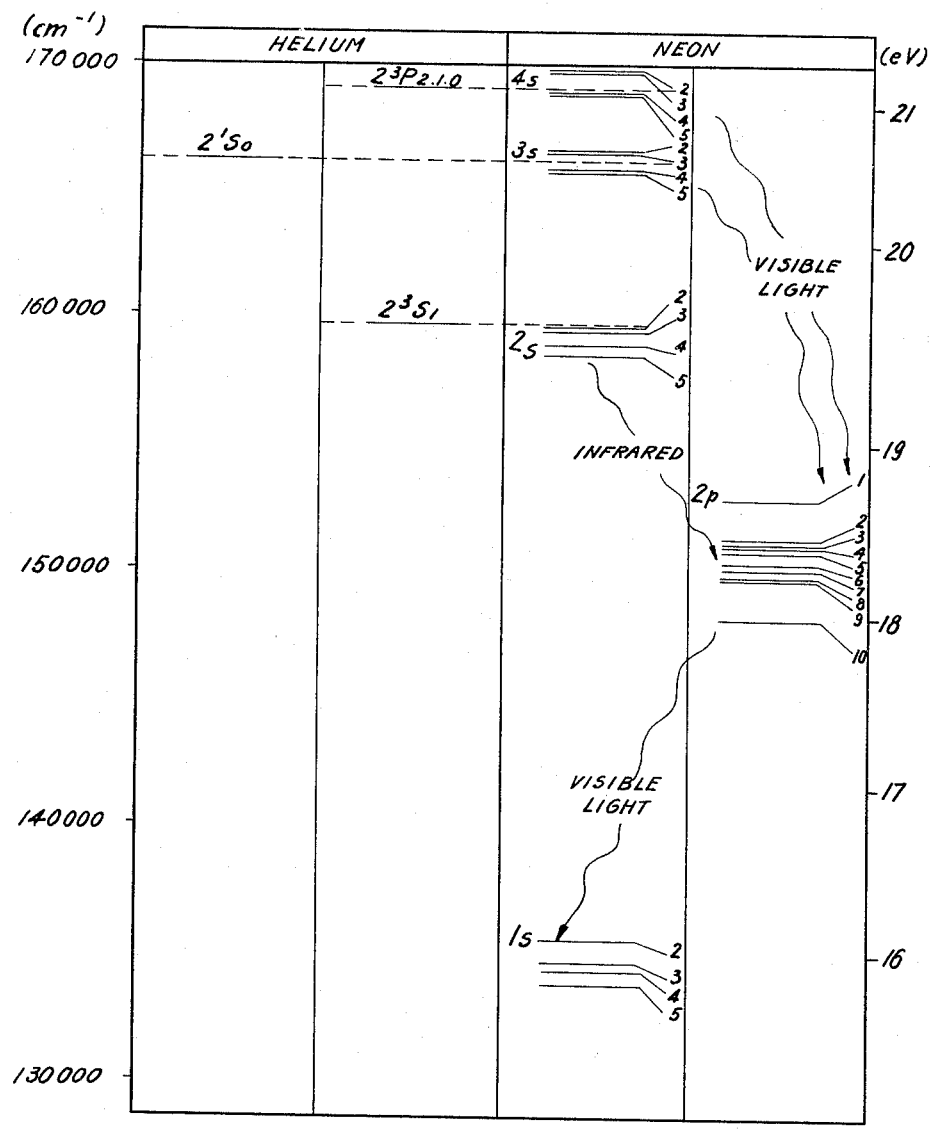

FIG. 2

| HELIUM TERM | $2^1S_0$ (METASTABLE) | | | | | | | | | $2^3P_{2,1,0}$ | | | | |
|---|---|---|---|---|---|---|---|---|---|---|---|---|---|---|
| NEON STARTING TERM | $3s_5(5\,^3P_2)$ | | $3s_4(5\,^3P_1)$ | | $3s_3(5\,^3P_0)$ | | $3s_2(5\,^1P_1)$ | | $4s_5(6\,^3P_2)$ | | $4s_4(6\,^3P_1)$ | |
| | WAVE LENGTH (AU) | END TERM PASCHEN SYMBOL | WAVE LENGTH (AU) | END TERM PASCHEN SYMBOL | WAVE LENGTH (AU) | END TERM PASCHEN SYMBOL | WAVE LENGTH (AU) | END TERM PASCHEN SYMBOL | WAVE LENGTH (AU) | END TERM PASCHEN SYMBOL | WAVE LENGTH (AU) | END TERM PASCHEN SYMBOL |
| | 6760 | $2p_2$ | 7725 | $2p_1$ | | | 7305 | $2p_1$ | | | | |
| | | | 6667 | $2p_3$ | 6422 | $2p_2$ | 6401 | $2p_2$ | 5589 | $2p_2$ | 5576 | $2p_2$ |
| | | | | | | | 6352 | $2p_3$ | | | 5538 | $2p_3$ |
| | 6640 | $2p_5$ | 6603 | $2p_5$ | | | 6328 | $2p_4$ | 5533 | $2p_4$ | | |
| | 6445 | $2p_6$ | 6410 | $2p_6$ | 6314 | $2p_5$ | 6294 | $2p_5$ | 5507 | $2p_5$ | 5494 | $2p_5$ |
| | 6365 | $2p_7$ | 6330 | $2p_7$ | | | 6118 | $2p_6$ | 5372 | $2p_6$ | 5360 | $2p_6$ |
| | 6247 | $2p_8$ | 6214 | $2p_8$ | 6065 | $2p_7$ | 6046 | $2p_7$ | 5316 | $2p_7$ | 5305 | $2p_7$ |
| | 6182 | $2p_9$ | | | | | | $2p_8$ | 5234 | $2p_8$ | 5222 | $2p_8$ |
| | 5690 | $2p_{10}$ | 5662 | $2p_{10}$ | 5449 | $2p_{10}$ | 5939 |  | 5188 | $2p_9$ | | |
| | | | | | | | 5433 | $2p_{10}$ | | | 4827 | $2p_9$ |

INVENTOR.
Wolfgang Friedl
BY Michael S. Striker
Attorney

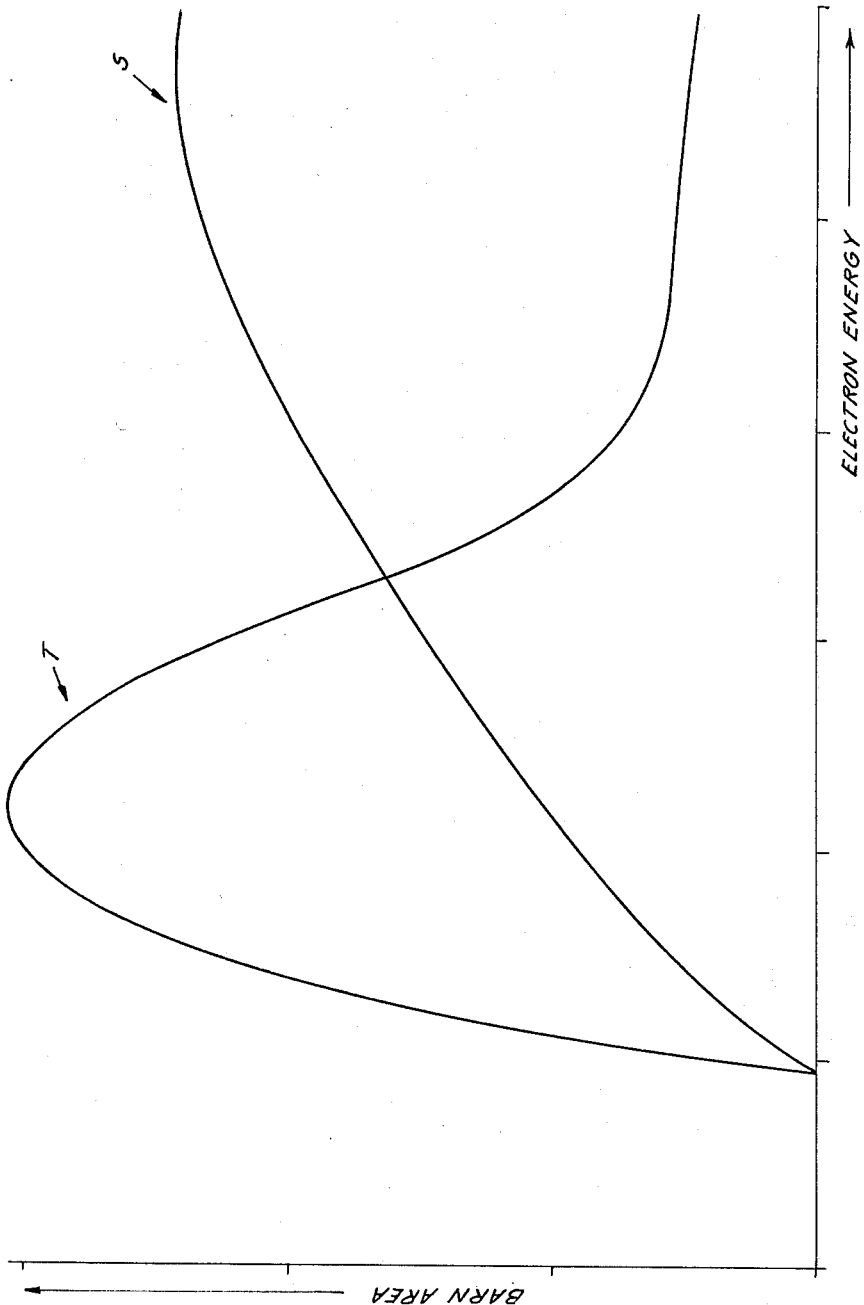

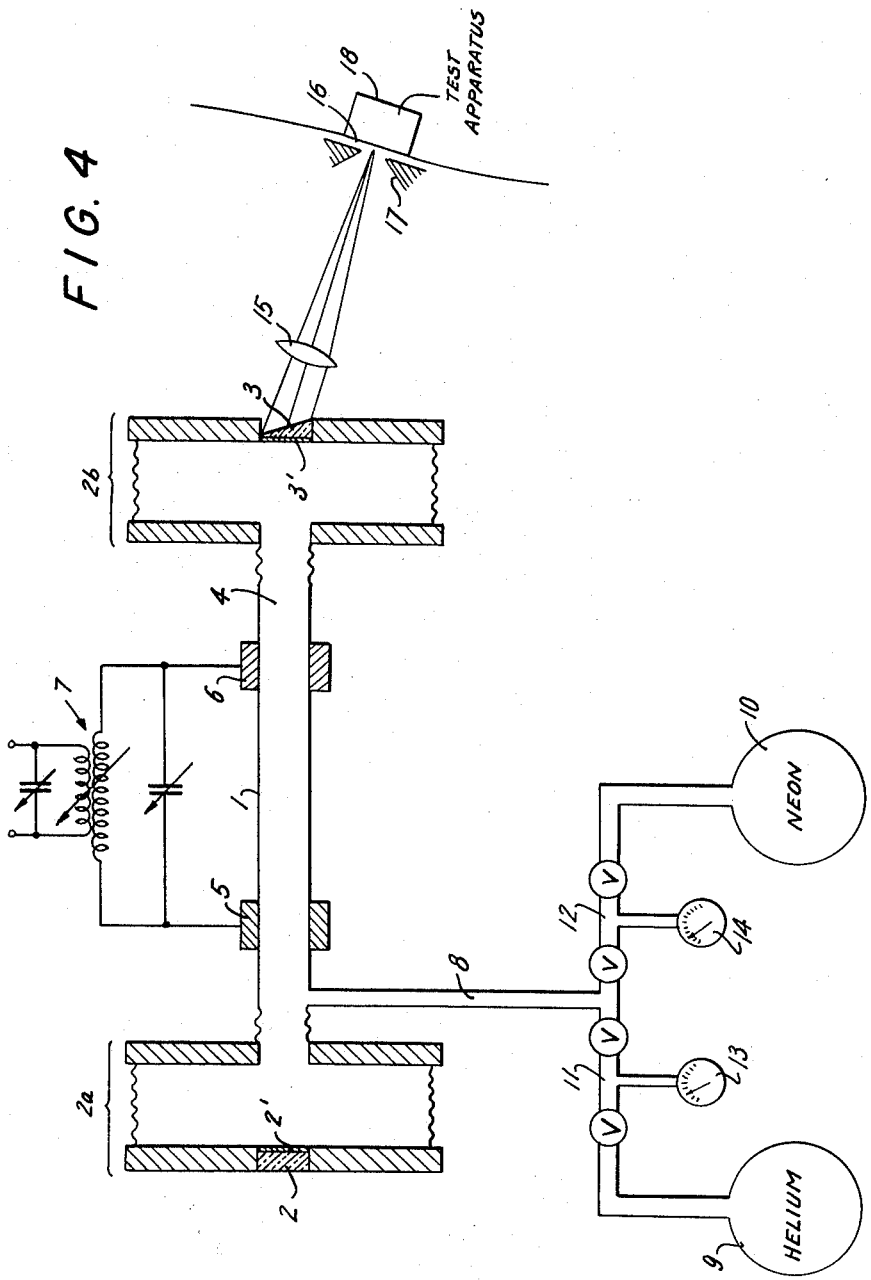

United States Patent Office 3,311,843
Patented Mar. 28, 1967

3,311,843
VISIBLE He-Ne LASER HAVING A PRESSURE BELOW 0.8 TORR
Wolfgang Friedl, Hanau am Main, Germany, assignor to Quarzlampen Gesellschaft m.b.H., Hanau am Main, Germany
Filed Mar. 18, 1963, Ser. No. 265,952
Claims priority, application Germany, Mar. 19, 1962, Q 704
5 Claims. (Cl. 331—94.5)

The present invention concerns a quantum-mechanical oscillator for producing an oriented beam of coherent radiation in the visible range of the spectrum.

Quantum-mechanical oscillators or amplifiers, sometimes also called "Quasers," are devices which make it possible to produce an oriented pencil of rays with an extremely high intensity (electromagnetic energy density) which could not be produced up to now. The operation of these devices is based on the fact that in atoms, molecules or solid bodies (crystals) certain terms defined by specific conditions or activations are populated to a greater degree than other terms of lesser energy (inversion population) so that at a given moment emission transfer takes place from a term of higher energy to a term or several terms of lesser energy while at the same time radiation is emitted. This takes place in such a manner that such spontaneous emission transfers initiate by their electromagnetic field so-called induced emission transfers which are more frequent than the corresponding absorption transfers. The radiation released in this procedure is substantially coherent. By certain means it is possible to arrange matters so that the majority of the induced radiation is emitted in a particular predetermined and preferred direction. In this manner a pencil of rays with extremely high energy density of the electromagnetic field is obtained resulting in correspondingly high intensities of irradiation of any object or surface upon which such a pencil of ray impinges.

Already for some time efforts have been made to develop quantum-mechanical oscillators or amplifiers for wave lengths also in the visible portion of the spectrum. This type of devices has been given the name "laser" (Light Amplifier by Stimulater Emission of Radiation). Up to now the desired result could be achieved only by means of special crystal systems. Such lasers also generally called crystal-lasers or solid body lasers are, however, subject to certain weaknesses whereby their applicability is considerably limited. One of these weaknesses resides in the fact that the crystals assume unduly high temperatures during operation so that a continuous operation is not possible. Moreover it has not been possible up to now to produce the crystals so as to be sufficiently homogeneous. Thus one of the most important theoretical advantages of a laser namely the induced radiation emission in one specific predetermined and preferred direction could be utilized only to an insufficient degree. In addition, under such circumstances the width of the spectral lines is comparatively great. Consequently also narrow band widths could not be produced with a crystal laser.

There are known quantum-mechanical oscillators or amplifiers which are operated with a mixture of helium and neon gas. The gas mixture consists predominantly of helium atoms while the neon atoms are present in a much lower concentration. It is possible to excite or activate the helium atoms e.g. by means of an electrical gas discharge, in such a manner that the metastable helium term $2^3S_1$ is strongly occupied. In this connection it should be noted that hereinafter the helium terms are designated in accordance with the Paschen symbol system. These metastable helium atoms can be caused by collisions of the second kind with neon atoms to occupy preferentially their $2s$ level, or term. On account of this occupation radiation is emitted in the near infrared spectral range i.e. with a wave length approximately between 1.1 and $1.3\mu$. On the basis of this knowledge quantum-mechanical oscillators of the helium-neon type have been operated up to now only for producing radiation in the just mentioned infrared spectral range.

In the preceding paragraph the expression "collisions of the second type" has been used. In order to avoid a misunderstanding it may be pointed out that in this field collisions of the first type are those by which the kinetic energy of the active collision element is converted into potential energy of the passive collision element. In the case of collisions of the second type the potential energy of one of the collision elements is converted into potential energy of the other collision element.

In view of the above it is one object of this invention to provide for an apparatus of the general type set forth which is so modified that it is capable of producing an oriented beam of coherent radiation also in the visible range of the spectrum.

It is another object of this invention to provide for an arrangement of the type set forth which is capable of substantially isolating in the emitted beam the radiation in the visible range of the spectrum.

With above objects in view the invention includes a quantum-mechanical oscillator for producing an oriented beam of coherent radiation in the visible range of the spectrum, comprising, in combination, a tubular gas discharge chamber means having an inner diameter of up to 1.5 cm.; first and second reflector means located at the opposite ends of said tubular gas discharge chamber means for reflecting between themselves in axial direction of said chamber means radiation produced therein, the first reflector means at one of said ends causing total reflection, the second reflector means at the opposite end causing only partial reflection and permitting emission of coherent radiation therethrough in said axial direction; a gaseous filling arranged in said tubular gas discharge chamber means and comprising a mixture of helium and neon gas at a predetermined pressure; means for creating said predetermined gas pressure in said discharge chamber; and high-frequency generator means including electrode means assembled with said tubular gas discharge chamber means for producing in said gaseous filling therein high frequency gas discharges resulting in said radiation, the spectral range thereof extending from the infrared obtainable with helium-neon quantum-mechanical oscillators into the visible part of the spectrum.

Before going into further details it is to be pointed out that it has been discovered to the surprise of those skilled in the art that it is possible to obtain from a quantum-mechanical oscillator filled with a helium-neon mixture also an oriented beam of radiation in the visible range of the spectrum provided that the conventional reflector devices arranged at the two ends of the discharge chamber are made of so-called Fabry-Perot plates which are specifically suited for this particular range of the spectrum. It may be added here that so-called Fabry-Perot plates are known to the art and have been described for instance in "Electronics," vol. 35, No. 1, of Jan. 5, 1962, pages 108–110.

In the course of basic research about the above mentioned collisions of the second type it has been found and has been confirmed by experiments that in a helium-neon mixture neutral helium atoms in their $2\ ^1S_0$ or $2\ ^3P_{2,1,0}$ term or state are capable to excite neon atoms by collisions of the second type therewith in such a manner that their $3s$ and $4s$ terms, respectively are at least partly preferentially occupied and that hereafter radiation in the visible range of the spectrum is emitted on account of permitted transfers between the just mentioned terms and the 2p terms. However, up to now this possibility or phenomenon has been considered as being too insignificant for being utilized in the operation of the known helium-neon oscillator. However it is a fact that by suitably preparing the reflecting surfaces of the Fabry-Perot plates an oriented beam of radiation in the visible range of the spectrum can be produced with an intensity which is substantially of the same order as the intensity of the normally obtained infrared radiation and which normally will be only somewhat smaller. A suitable preparation of the reflecting surfaces as mentioned above is such a preparation which results in the least possible absorption in the particular desired spectral range and at the same time in the maximum possible reflection in that same range notwithstanding the intended capacity of one of the reflecting surfaces to permit passing of radiation therethrough.

Another possibility of utilizing a quantum-mechanical oscillator or amplifier of the helium-neon type for the production of a beam of visible light (it may be used together with the above mentioned special preparation of the Fabry-Perot plates) is the combination of the oscillator with a monochromator for the purpose of separating from the emitted beam the visible spectral lines. This is well feasible and even advisable because in view of the high amplification factor of quantum-mechanical oscillators the unavoidable losses in a monochromator are comparatively insignificant.

On the other hand, the operation of a known helium-neon oscillator may be modified in such a manner that the visible portion of the emitted radiation is considerably increased. This may be achieved, in addition to or irrespective of the above mentioned suitable preparation of the Fabry-Perot plates for the desired spectral range, by reducing the gas pressure in the discharge chamber from the pressure range that has been used up to now for producing infrared radiation. Similarly, this result may be achieved by increasing the strength of the electrical field in the gas discharge chamber beyond the values known to produce infrared radiation. The important point is that the electron temperature which is available and required for the excitation of the helium atoms is increased to such a degree that it is possible to occupy to a greater degree the $2\ ^1S_0$ and $2\ ^3P_{2,1,0}$ terms of the helium atoms which require a greater excitation energy than the $2\ ^3S_1$ term. Since particularly the $2\ ^3P_{2,1,0}$ term of the helium atom has a substantially shorter life time than the metastable $2\ ^3S_1$ term and since from the latter term by means collisions of the second type between helium atoms and neon atoms the $2s$ term of the latter are intensively occupied whereby infrared radiation is produced, a comparative increase of the desired effect is obtainable also by a corresponding suitable reduction of the inner diameter of the gas discharge chamber because in the case of such a small diameter or cross section the $2\ ^3S_1$ term of the helium atoms is more frequently emptied or released by collisions of these atoms with the walls of the chamber.

If the above conditions are observed singly or jointly an oriented beam or pencil of rays is produced which under the well known normal conditions of electrical gas discharges contain predominantly certain spectral lines in the visible range of the spectrum. Consequently the novel oscillator according to the invention is particularly well suited for being utilized in various fields as for instance for effecting photochemical reactions in the fields of biological, botanical and chemical research, for industrial utilization of such reactions for producing chemical compounds, for the exploration and utilization of selective photochemical reactions which are dependent on certain wave lengths etc. In all these cases it is possible to utilize the oscillator proper alone or in combination with devices for splitting up the emitted radiation in order to isolate a preferred or desired spectral range thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagram illustrating different terms or energy levels of the neutral helium and neon atoms, respectively, and showing the permitted radiation transfers therebetween which are of significance for the present invention;

FIG. 2 is a chart indicating those wave lengths which can be produced in the visible spectral range by means of preferential occupation of the $2\ ^1S_0$ and/or the $2\ ^3P_{2,1,0}$ terms;

FIG. 3 is a qualitative diagram of the so-called "barn door areas" for the excitation of the triplet and singlet terms depending upon the electron energy (i.e. the so-called excitation functions); and FIG. 4 is a diagrammatic illustration of a quantum-mechanical oscillator according to the invention combined with monochromator means.

In the diagram of FIG. 1 the energy levels or terms of interest in this context are marked next to each other both for the neutral helium atom and the neutral neon atom. In the case of the occurrence of collisions of the second type an energy exchange between an excited helium atom and a neon atom takes place in such a manner that in the case of a neon atom a term is occupied which has approximately the same excitation energy as the previously occupied helium term. Thus for instance the helium term $2\ ^1S_0$ can cause preferential occupation of the neon terms $3s_{2,3,4,5}$ and the helium term $2\ ^3P_{2,1,0}$ can cause preferential occupation of the neon terms $4s_{2,3,4,5}$. In this manner the so-called "inversion population" of these neon terms relative to certain neon terms of lesser energy is produced. Under these circumstances, the permitted emission transfers between the different above mentioned neon terms of higher energy and the various neon terms of lesser energy take place with the result that radiation is emitted. The wave length of the emitted radiation depends on the difference between the energies of the respective terms. Thus for instance visible radiation is produced as a result of transfer from the $4s$ and $3s$ terms of the neon atom to the $2p$ terms thereof while the transfer from the $2s$ terms to the $2p$ terms produces infrared radiation. A list of the wave lengths in the visible range of the spectrum and associated with the above transfers is given by the chart FIG. 2. It should be noted that in the second line of the chart FIG. 2 the Paschen symbols are followed by the corresponding Russel-Saunders symbols in parentheses.

In the case of the helium atom not only the above discussed $2\ ^1S_0$ and $2\ ^3P_{2,1,0}$ terms are occupied but also other terms, particularly the $2\ ^3S_1$ term which by collisions of the second type preferentially occupies the $2s$ term of the neon atom whereby infrared radiation is produced. In the case of a glow discharge generally, and particularly in the case of a high frequency discharge in a helium-neon mixture, the helium term $S\ ^3S_1$ is predominantly occupied while the partial pressure of the helium is about 1 torr and the partial pressure of the neon is about $10^{-1}$ torr. Thereafter the infrared radiation is predominantly present in such case. Consequently, since it is an object of this invention to produce an oriented beam of radiation in the visible spectral range, the conventional operation must be modified.

This will be understood by having reference to FIG. 3 which illustrates the relation between the so-called "barn door area" and the electron energy. The expression "barn door area" is intended to define by its magnitude the probability of collisions of the second type that are likely to occur between two types of atoms. Therefore the dimension is that of an area and its unit is $10^{-24}$ cm.$^2$. As can be seen from FIG. 3 the excitation function for a triplet term T is represented by a curve which differs from the shape of the curve illustrating that corresponding to a singlet term S. It is readily understandable that for the preferential occupation of the $2\ ^1S_0$ term which constitutes a higher energy level than the $2\ ^3S_1$ term a higher electron energy is required. However it is important that the curve T corresponding to the triplet term drops off relatively steeply after having reached its maximum while the curve S referring to the singlet term drops off from its maximum comparatively slowly. Consequently it is possible to produce by increasing the mean electron velocity in the gas discharge chamber, if possible beyond the maximum of the curve S referring to the singlet term, a condition which greatly reduces the chances for the production of infrared radiation while the chances for the production of visible radiation are greatly improved. It has been found that it is particularly advantageous if for this purpose, all other factors being left unchanged, the gas pressure is reduced below .8 torr.

It may be added here that the pressure unit 1 torr corresponds to the pressure of 1 mm. mercury column at 0° C.

FIG. 4 illustrates diagrammatically a quantum-mechanical oscillator according to the invention in combination with monochromator means as described further below. The oscillator comprises essentially a tubular gas discharge chamber consisting of a cylindrical tube 1 made of molten quartz and having a diameter in the range between 1 and 2 cms. The tube 1 is closed at one of its ends by an optical member or plate 2 provided with a reflecting layer 2', and at the opposite end with another optical member 3 provided on its inner face with a reflecting layer 3'. However, the reflecting layer 2' is capable of completely reflecting radiation impinging thereon while the reflecting layer 3' is only capable of partial reflection and therefore permits some radiation to pass therethrough in the axial direction of the tube 1. In addition in the example shown the optical member 3 is a prism for reasons described hereafter.

The optical members 2 and 3 are held or mounted in adjustable devices 2a and 2b, respectively, which may comprise bellows portions, so that by means of these devices functioning in a well known manner the reflecting surfaces of the members 2 and 3 can be adjusted to be perfectly parallel with each other. The reflecting layers 2' and 3' are prepared in the manner well known for so-called Fabry-Perot plates as mentioned above.

The interior 4 of the tube 1 is filled with a mixture of helium and neon gas. Two outer electrodes 5 and 6 are mounted on the tube 1 but in certain cases an intermediate layer of material, e.g. an asbestos foil may be placed between the individual electrodes and the wall of the tube. Well suited as electrodes are thin metal foils which may be attached to the tube 1 in the form of sleeves. A high frequency generator of conventional design 7 is connected with the electrodes 5 and 6 and may have an output voltage between 200 and 600 volts and operate at a frequency of about 20 to 50 megacycles. Hereby a capacitive high frequency gas discharge is produced in a well known manner within the interior of the tube 1.

The high frequency discharge within the tube 1 causes intensive movement of electrons whereby the helium atoms are excited. The terms of the helium atoms occupied as a result of this excitation are partly discharged or emptied again by spontaneous emission transfers. However, in those cases where the respective terms are metastable (or in the case of certain terms immediately after their occupation) the discharge or release takes place predominantly through other elementary processes namely on account of collisions of the second type with neon atoms or collisions with the walls of the discharge chamber. The terms of the neon atoms thus selectively occupied will first emit spontaneously without any preference for any particular direction of radiation. However those quantums which are being emitted in the direction of the axis of the tube 1 are at least partly reflected repeatedly by and between the reflecting surfaces or layers 2' and 3' of the optical members 2 and 3, respectively, and are therefore capable to induce other neon atoms to emit radiation at the same frequency, this induced emission taking place also in the same direction and in phase with the inducing radiation. In this manner the intensity of the radiation is greatly increased in said preferred and predetermined axial direction. In view of the direction of the excitation the emitted radiation is oriented substantially parallel with the tubular axis and the desired pencil of rays will be permitted to pass with an extremely strong intensity through the optical member 3.

The required gas mixture may be introduced into the tube 1 through the duct 8 after the gas mixture has been prepared and its pressure has been adjusted by means of operating the various valves in a well known manner. In order to be able to adjust the mixture proportion and the ratio between the partial pressures of the helium and of the neon gas a storage container 9 for the helium and a storage container 10 for the neon is provided which can be made to communicate with the duct 8 across intermediate chambers 11 and 12, respectively, which are provided with pressure gauges 13 and 14, respectively.

If infrared radiation output is desired an overall gas pressure of about 1.1 torr with a neon partial pressure of $10^{-1}$ torr is to be provided for. However if with an overall gas pressure of less than .8 torr a neon partial pressure of less than $10^{-1}$ torr is provided, the production of radiation in the visible range of the spectrum is greatly favored.

As mentioned further above it is sometimes highly desirable to isolate in the radiation output a fraction of the available spectral range or even certain spectral lines. Therefore it is of advantage for this purpose to combine the actual oscillator with a monochromator which will then operate in a well known manner to produce the first mentioned effect. However, since the pencil of rays produced by the oscillator is already composed of rays in parallel array, the entire input portion of a conventional monochromator can be saved so that the monochromator means to be added to the oscillator will comprise substantially only a prism and a focusing device. However even this arrangement can be further simplified by constructing the optical member 3 itself as a prism. By selecting the angle of the prism a desired range of wave lengths within the visible spectral range can be isolated in the radiation output of the oscillator while all other undesired wave lengths which are also emitted by the oscillator are eliminated.

FIG. 3 illustrates the last mentioned simplified arrangement. The radiation passing through the reflecting surface 3' is spectrally split up by the prism 3 so that a selected wave length can be concentrated by means of a single telescope lens 15 on the focal curve 16 and may be passed through a slot device 17 and applied to a test apparatus of any suitable kind arranged directly beyond the slot 17. In this manner most of the conventionally used components of a monochromator are saved and the overall length of the entire arrangement is greatly reduced.

It will be understood that each of the elements described above, or two or more together, may also find a useful application in other types of quantum-mechanical oscillator for producing an oriented beam of coherent radiation differing from the types described above.

While the invention has been illustrated and described as embodied in quantum-mechanical oscillator for producing an oriented beam of coherent radiation in the visible range of the spectrum, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Quantum-mechanical oscillator for producing an oriented beam of coherent radiation in the visible range of the spectrum, comprising, in combination, a tubular gas discharge chamber means having an inner diameter of up to 1.5 cm.; first and second reflector means located at the opposite ends of said tubular gas discharge chamber means for reflecting between themselves in the axial direction of said chamber means radiation produced therein, the first reflector means at one of said ends causing total reflection, the second reflector means at the opposite end causing only partial reflection and permitting emission of coherent radiation therethrough in said axial direction; a gaseous filling arranged in said tubular gas discharge chamber means and comprising a mixture of helium and neon gas at a predetermined absolute pressure less than 0.8 torr; means for creating said predetermined gas pressure in said discharge chamber; and high-frequency generator means including electrode means assembled with said tubular gas discharge chamber means for producing in said gaseous filling by means of an electric field stronger than that causing only infrared radiation high frequency gas discharges resulting in said radiation, the spectral range thereof extending from the infrared obtainable with helium-neon quantum-mechanical oscillators into the visible part of the spectrum.

2. An oscillator as claimed in claim 1, including a monochromator means combined with said second reflector means for eliminating from said emission of said radiation any infrared radiation.

3. An oscillator as claimed in claim 2, wherein said reflector means include reflecting surface means having the characteristic of minimum absorption and maximum reflection of radiation in the visible range of the spectrum.

4. An oscillator as claimed in claim 2, wherein said monochromator means are a prism receiving the radiation transmitted past said second reflector means, and focusing means aligned with the light path emanating from said prism.

5. An oscillator as claimed in claim 2, wherein said second reflector means is a prism surface having a partly reflecting and partly transparent properties, said surface facing said discharge chamber means and being a part of said prism and said monochromator, and focusing means aligned with the path of light emitted from the other side of said prism.

References Cited by the Examiner
UNITED STATES PATENTS

| 3,144,617 | 8/1964 | Kogelnik et al. | 331—94.5 |
| 3,242,439 | 3/1966 | Ridgen et al. | 331—94.5 |

FOREIGN PATENTS 608,711    3//1962   Belgium.

OTHER REFERENCES

Bloom: "Observation of New Visible Gas Laser Transitions by Removal of Dominance," Applied Physics Letters, vol. 2, No. 5, pp. 101–102, Mar. 1, 1963.

Jacobs et al.: "Coherent Light Amplification in Optically Pumped Cs Vapor," Physical Review Letters, vol. 7, No. 11, pp. 415–417, Dec. 1, 1961.

Patel: "Optical Power Output in He-Ne and Pure Ne Maser," vol. 33, No. 11, pp. 3194–3195, November 1962.

JEWELL H. PEDERSEN, *Primary Examiner.*

E. S. BAUER, *Assistant Examiner.*